(12) United States Patent
Khan (10) Patent No.: US 12,337,664 B2
(45) Date of Patent: Jun. 24, 2025

(54) SEAL RETENTION CLIP FOR VEHICLE WINDOW ASSEMBLY

(71) Applicant: Atieva, Inc., Newark, CA (US)

(72) Inventor: Afsar Khan, Northbrook, IL (US)

(73) Assignee: Atieva, Inc., Newark, CA (US)

(*) Notice: Subject to any disclaimer, the term of this patent is extended or adjusted under 35 U.S.C. 154(b) by 0 days.

(21) Appl. No.: 18/475,506

(22) Filed: Sep. 27, 2023

(65) Prior Publication Data

US 2025/0100359 A1 Mar. 27, 2025

(51) Int. Cl.
*B60J 10/36* (2016.01)
*B60J 10/76* (2016.01)

(52) U.S. Cl.
CPC .............. *B60J 10/36* (2016.02); *B60J 10/76* (2016.02)

(58) Field of Classification Search
CPC ............. B60J 10/32; B60J 10/36; B60J 10/76
See application file for complete search history.

(56) References Cited

U.S. PATENT DOCUMENTS

| | | | |
|---|---|---|---|
| 5,584,526 A | 12/1996 | Soldner | |
| 8,226,517 B2 | 7/2012 | Tsai et al. | |
| 9,109,666 B1 | 8/2015 | Gauthier | |
| 10,780,845 B2* | 9/2020 | Kosidlo | B60J 10/36 |
| 10,797,562 B2 | 10/2020 | Dlala et al. | |
| 2011/0204671 A1* | 8/2011 | Baratin | B60J 10/265 |
| | | | 296/93 |
| 2015/0158382 A1 | 6/2015 | Mordukhovich et al. | |
| 2017/0175868 A1 | 6/2017 | Riera et al. | |
| 2019/0193542 A1* | 6/2019 | Prodoni | B60J 10/76 |
| 2020/0079298 A1* | 3/2020 | Takeda | B60J 10/20 |
| 2020/0156451 A1* | 5/2020 | Miyata | B60J 10/27 |
| 2021/0354538 A1 | 11/2021 | Miyata et al. | |
| 2023/0106800 A1 | 4/2023 | Hand et al. | |

FOREIGN PATENT DOCUMENTS

| | | | |
|---|---|---|---|
| DE | 20 2006 002 438 | * | 6/2006 |
| EP | 3507118 B1 | | 3/2022 |
| GB | 2 429 027 | * | 2/2007 |
| KR | 20120099684 A | | 9/2012 |
| WO | 2011060362 A1 | | 5/2011 |

OTHER PUBLICATIONS

International Search Report and Written Opinion for PCT Application No. PCT/US2024/048175, mailed on Jan. 3, 2025, 14 pages.

* cited by examiner

*Primary Examiner* — Gregory J Strimbu
(74) *Attorney, Agent, or Firm* — Brake Hughes Bellermann LLP (57) ABSTRACT

A vehicle comprises: a body including a frame defining an opening, the frame forming a flange; glass mounted to the body, wherein the flange extends substantially perpendicular to a plane of the glass in a first position of the glass; a seal extending along the flange and forming a first mouth and a channel, the seal including a protrusion inside the first mouth, wherein an end of the glass is positioned within the channel when the glass is in the first position; and a clip having a second mouth that defines a first angled end and a second angled end, wherein a portion of the flange is held by the second mouth, the seal mounted to the frame so that the clip is positioned in the first mouth, the first angled end abutting the protrusion, and the second angled end abutting an inside surface of the first mouth.

16 Claims, 9 Drawing Sheets

SEAL RETENTION CLIP FOR VEHICLE WINDOW ASSEMBLY

TECHNICAL FIELD

This document relates to a seal retention clip for a vehicle window assembly.

BACKGROUND

Most vehicles have one or more glass panels serving as windows into and out of a passenger compartment. Different types of glass installations have been used. For so-called door glass run channels on "frame under glass" door construction, the typical construction is a supported seal section, or a glass run channel, that is co-extruded with a metal carrier. For aerodynamically efficient vehicle designs, a surface offset at the B-pillar should also be minimized, which can create a limitation in B-pillar retention of the glass. When a vehicle is operating at high speed, the negative pressure on the glass surfaces creates a resulting force. If this resulting force exceeds the retention level of the glass run channel, a loss of function of the glass seal can occur, resulting in high noise levels inside the vehicle.

SUMMARY

In a first aspect, a vehicle comprises: a vehicle body including a frame defining an opening, the frame forming a flange; glass mounted to the vehicle body, the glass having at least a first position where an entirety of the opening is covered by the glass, wherein the flange extends substantially perpendicular to a plane of the glass in the first position; a seal extending along the flange, the seal forming a first mouth and a channel, the seal including a protrusion inside the first mouth, wherein an end of the glass is positioned within the channel when the glass is in the first position; and a clip having a second mouth that defines a first angled end and a second angled end, wherein a portion of the flange is held by the second mouth, the seal mounted to the frame so that the clip is positioned in the first mouth, the first angled end abutting the protrusion, and the second angled end abutting an inside surface of the first mouth.

Implementations can include any or all of the following features. The glass is moveable relative to the vehicle body into at least the first position and a second position, and wherein in the second position at least a portion of the opening is not covered by the glass. The vehicle comprises multiple clips. The vehicle body further comprises a closure that is openable, wherein the closure includes the frame. The closure comprises a first door of the vehicle. The closure further comprises a second door of the vehicle, the first door positioned forward of the second door in the vehicle, and wherein the vehicle comprises multiple clips, a greater number of the multiple clips mounted to the first door than to the second door. The seal further forms a lip inside the channel, the lip configured to abut the end of the glass when the glass is in the first position. The vehicle further comprises a gripper fin inside the first mouth. The seal comprises an elastomer material with a metal carrier inside the elastomer material. An opening of the first mouth and an opening of the channel are oriented in substantially perpendicular directions to each other. The protrusion extends along the seal, a profile of the protrusion being substantially triangular. The protrusion extends along the seal, the protrusion comprising a gripper fin or a rib. The second angled end defines a serration abutting the inside surface of the first mouth. The frame comprises a frame reinforcement panel joined to a door inner panel, the frame reinforcement panel and the door inner panel forming the flange. The clip comprises a back and a first side member and a second side member, each of the first and second side members extending from the back toward one side, wherein the first side member defines the first angled end, and wherein the second side member defines the second angled end. The first and second side members are angled toward each other to form the mouth, and wherein the first angled end is angled away from the second side member. The first and second side members are angled toward each other to form the mouth, and wherein the second angled end is angled away from the first side member.

In a second aspect, a clip comprises: a back; and a first side member and a second side member each extending from the back toward one side, the first and second side members forming a mouth, the first side member defining a first angled end that is angled away from the second side, the second side member defining a second angled end that is angled away from the first side member, the second angled end forming a serration, the first side member further defining a barb that extends into the mouth.

Implementations can include any or all of the following features. The first and second side members are angled toward each other. The serration includes substantially rectangular openings. The serration extends substantially through an entire depth of the second angled end. The first angled end is oriented in a direction, and wherein the barb is oriented along the direction of the first angled end. The clip has a slot in the first side member, the slot defining a pointed end that is oriented in a direction away from the first angled end, and wherein the barb is formed by the pointed end. The slot forms a narrowing of a width of the first side member, and wherein the first angled end begins at the narrowing. The first side member further defines another barb that also extends into the mouth.

BRIEF DESCRIPTION OF DRAWINGS

Like reference symbols in the various drawings indicate like elements.

DETAILED DESCRIPTION

This document describes examples of systems and techniques that improve the functionality of glass mounted to a vehicle. The present subject matter can improve the retention of the glass for demanding use cases such as driving at high speed. For example, better sealing between the glass and the rest of the vehicle lowers the amount of noise in the passenger cabin.

Examples herein refer to a vehicle. A vehicle is a machine that transports passengers or cargo, or both. A vehicle can have one or more motors using at least one type of fuel (e.g., gasoline or diesel) or other energy source (e.g., electricity). Examples of vehicles include, but are not limited to, cars, trucks, and buses. The number of wheels can differ between vehicle types, and one or more (e.g., all) of the wheels can be used for propulsion of the vehicle.

Examples herein refer to a vehicle body. A vehicle body is the main supporting structure of a vehicle to which components and subcomponents are attached. The vehicle body includes what during manufacturing is referred to as the body-in-white. For example, the body-in-white includes the frame and bodywork of the vehicle that provides its constituent structure. A vehicle body can include one or more vehicle closures. A vehicle body can include a passenger cabin with room for one or more occupants, one or more trunks or other storage compartments for cargo, and various panels and other closures providing protective and/or decorative cover.

Examples herein refer to a vehicle closure. As used herein, a closure of a vehicle is a moveable component that selectively prevents (when closed) or enables (when open) egress to at least one region of the vehicle. The vehicle region can be a passenger compartment or a trunk (e.g., positioned at the rear end, at the front end, or elsewhere in the vehicle), or another storage compartment, to name just a few examples. In some implementations, a closure can include a vehicle door, a vehicle trunk lid, a vehicle liftgate, and/or a vehicle hood.

Examples herein refer to glass of a vehicle. As used herein, glass includes any transparent material covering an opening of a vehicle. Glass can include, but is not limited to, a windscreen, a side window, a rear window, or a roof panel. The glass can be mounted to a closure or to another part of the vehicle body. The glass can be mounted stationary or be movable. The glass can be made of any material that provides the required transparency and required functional characteristics for the type of vehicle. The material(s) of the glass can include, but is not limited to, any non-crystalline transparent solid material, silicate glass, tempered glass, or safety glass. The glass can have a single layer or can be a laminate of two or more layers. For example, one or more of such layers can be of a material other than glass (including, but not limited to, an adhesive or a polymer material).

Examples herein refer to a seal. As used herein, a seal is made using any material that provides sealing between at least two components. The sealing can serve to prevent leakage, contain pressure, and/or exclude contamination. In some implementations, the seal can include mainly an elastomer material (e.g., synthetic rubber). For example, the seal can include mainly a thermoset material. As another example, the seal can include mainly a thermoplastic material.

Examples described herein refer to a top, bottom, front, side, or rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 1:
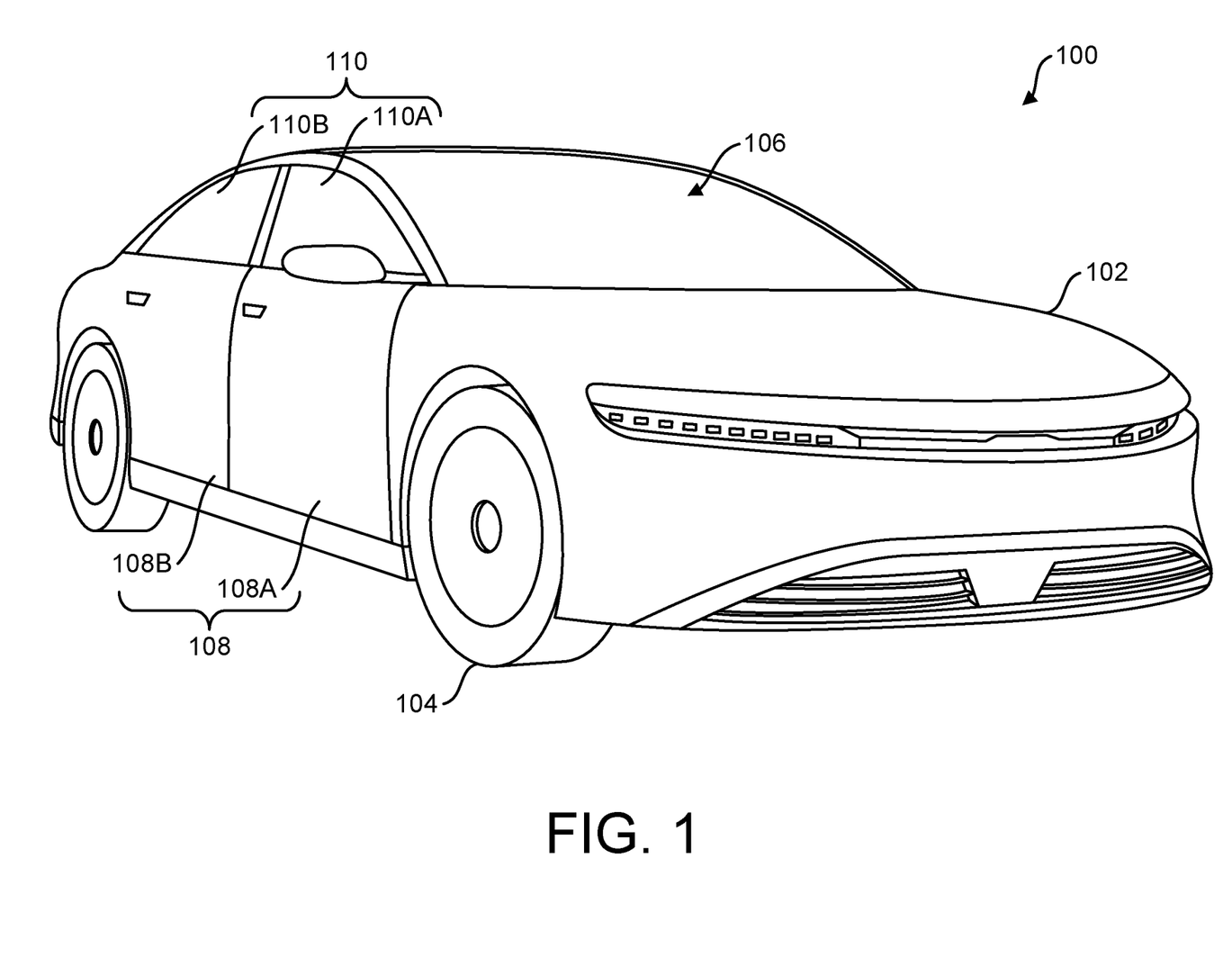
FIG. 1 shows an example of a vehicle having a window assembly with a seal retention clip according to the present subject matter.

FIG. 1 shows an example of a vehicle 100 having a window assembly with a seal retention clip according to the present subject matter. One or more other examples described elsewhere herein can be used with the vehicle 100. The vehicle 100 has a vehicle body 102 suspended on road wheels 104 (e.g., four road wheels, or a different number of wheels). The vehicle 100 forms a passenger cabin 106 that is accessible at least by way of one or more closures 108 of the vehicle body 102 that are openable. For example, the closures 108 can include a front door 108A and a rear door 108B. Another number of, and/or different types of, closures can be used instead or additionally.

The vehicle 100 can have one or more windows 110 for the passenger cabin 106 provided by at least one glass. The window(s) can be mounted to the vehicle body 102, including, but not limited to, by being mounted to one or more of the closures 108. Here, the front door 108A has a glass 110A, and the rear door 108B has a glass 110B. The windows 110 can also or instead include a windshield and/or a rear window, to name just two examples. As such, one or more of the windows 110 can be mounted to a frame included in the vehicle body 102. For example, the front door 108A can include a frame defining an opening that is (at least temporarily) covered by the glass 110A. Similarly, the rear door 108B can also or instead include a frame for the glass 110B. Each of the glasses 110A-110B can be installed so as to be moveable relative to the rest of the vehicle 100, and is currently in a closed position. As such, each of the glasses 110A-110B has at least a first position where an entirety of the opening is covered by the glass (e.g., as shown). If the glass 110A and/or 110B can assume another position, the glass 110A/110B can then be in a second position where at least a portion of the opening is not covered by the glass (e.g., a partially open window position, or a fully open window position).

The vehicle 100 can have sealing for any or all of the windows 110. The sealing can be provided by assembling a seal to the vehicle body using one or more clips according to the present subject matter. The sealing can increase the retention of the glass 110A and/or 110B and thereby reduce noise and/or improve another performance characteristic of the vehicle 100. The sealing can include multiple clips. In some implementations, the front door 108A can have a greater number of clips than does the rear door 108B. For example, when the vehicle 100 is traveling forward, a higher vacuum can be created at the glass 110A than at the glass 110B (because the front door 108A is positioned forward of the rear door 108B). The created vacuum results in a load (i.e., outward force) on the glass. The load on the glass 110A is therefore greater than the load on the glass 110B. Accordingly, more clips can be used on the front door 108A than on the rear door 108B.

Figure 2:
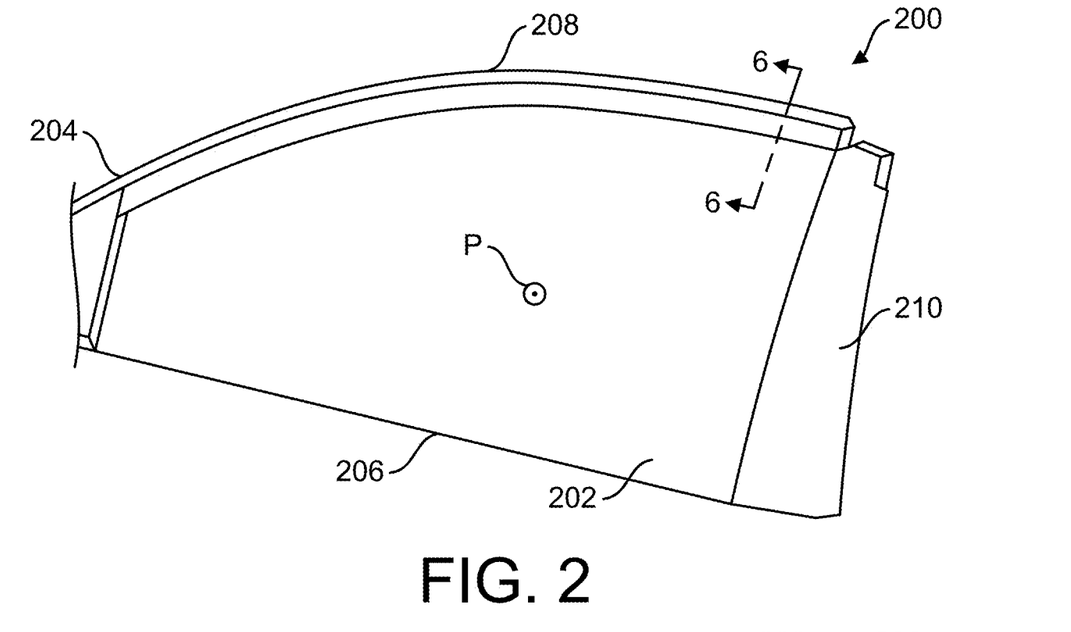
FIG. 2 shows an example of a window assembly that can be used with the vehicle of FIG. 1.
Figure 3:
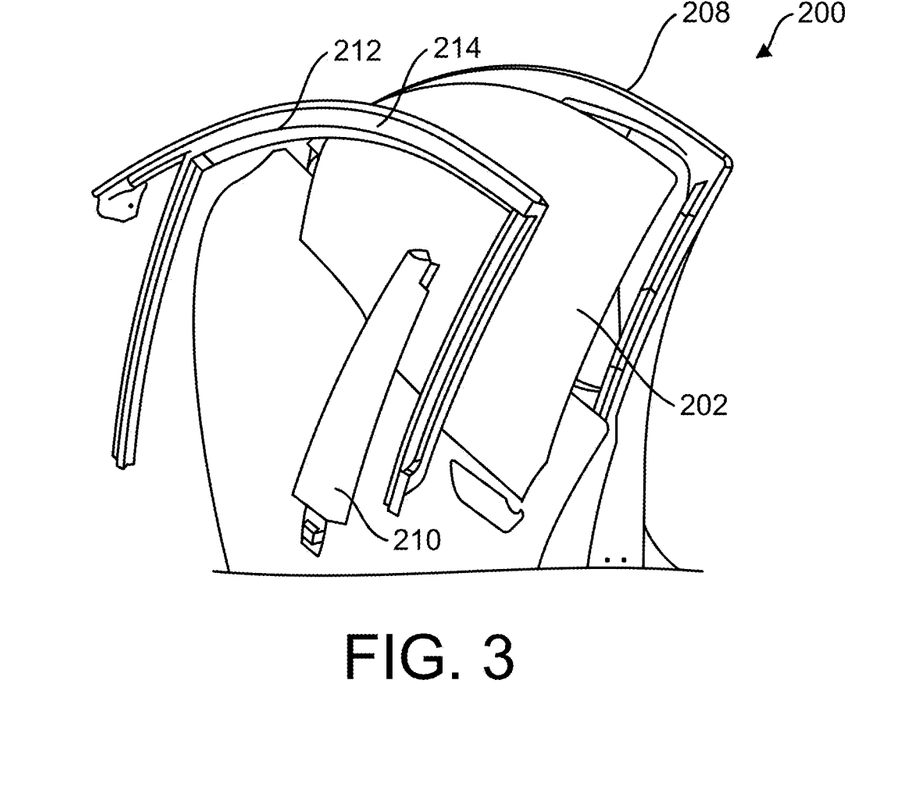
FIG. 3 shows an exploded view of the window assembly of FIG. 2.

FIG. 2 shows an example of a window assembly 200 that can be used with the vehicle 100 of FIG. 1. FIG. 3 shows an exploded view of the window assembly 200 of FIG. 2. The window assembly 200 can be used with one or more other examples described elsewhere herein. The window assembly 200 includes a glass 202 (e.g., any of the windows 110 in FIG. 1) that is subject to outward pressure P as a result of the aerodynamic effects of air flow during travel, particularly at highway speeds. The outward pressure P is here schematically illustrated as a force vector that is normal to the plane of the glass 202 (i.e., that extends out toward the viewer in the present illustration).

The window assembly 200 provides retention that copes with the outward pressure P. A seal assembly with one or more clips according to the present subject matter can provide sufficient retention of the glass 202 for the intended use of the vehicle. A region 204 of the window assembly 200 is at or near the A-pillar of the vehicle (i.e., the pillar that supports the roof and is situated in front of the driver). Accordingly, an A-pillar retention at the region 204 can be evaluated to ensure that the window assembly 200 meets requirements. A region 206 of the window assembly 200 is at or near the upper edge of the door body, here referred to as a beltline of the door. Accordingly, a beltline retention at the region 206 can be evaluated to ensure that the window assembly 200 meets requirements. A header region 208 of the window assembly 200 is at or near the top of the frame that surrounds the glass 202. Accordingly, a header retention at the header region 208 can be evaluated to ensure that the window assembly 200 meets requirements.

An applique 210 is configured to at least partially cover a B-pillar, the applique 210 providing a decorative surface toward the exterior of the vehicle. For aerodynamically efficient vehicle designs, it may be desirable to minimize the surface offset at the B-pillar, meaning the difference in depth between the plane of the glass 202 and the outward-facing surface of the applique 210. When the offset is zero or essentially zero, this can be referred to as a flush glass-to-B-pillar design. In a flush glass-to-B-pillar design, the applique 210 does not contribute significantly (or at all) to B-pillar retention.

The window assembly 200 includes a glass run assembly 212 that provides retention for the glass at a wide range of load cases. For example, the glass run assembly 212 includes at least a seal and a clip according to the present subject matter. A glass run finisher 214 can be positioned on the glass run assembly 212 to face outward, for example to provide a decorative finish.

Figure 4A:
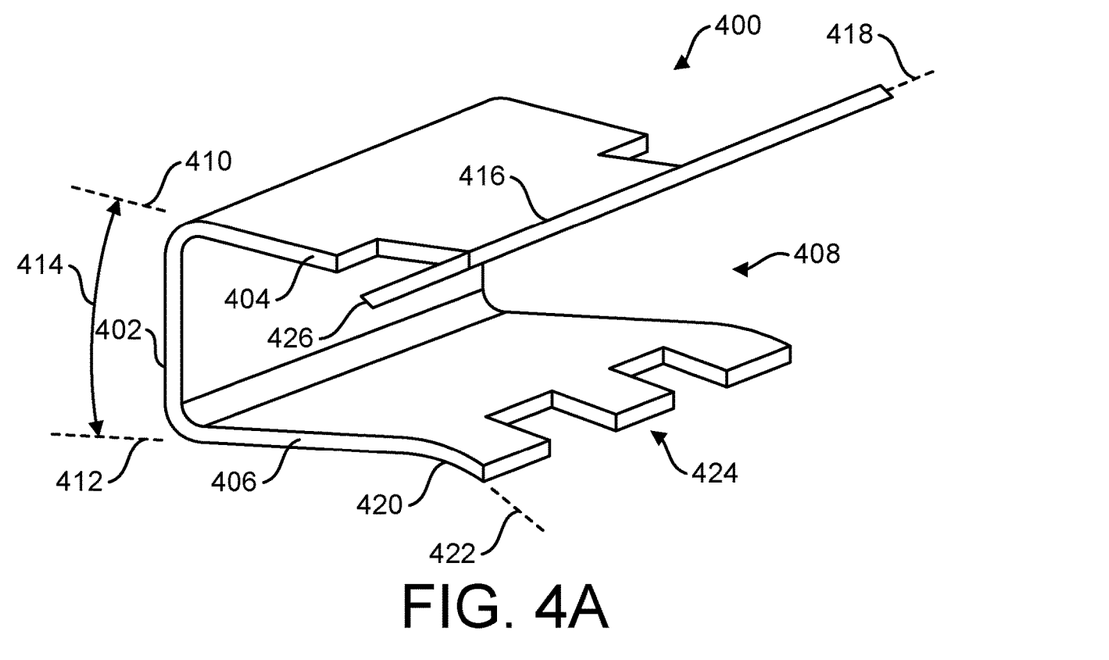
FIG. 4A shows an example of a clip that can be used for seal retention.
Figure 4B:
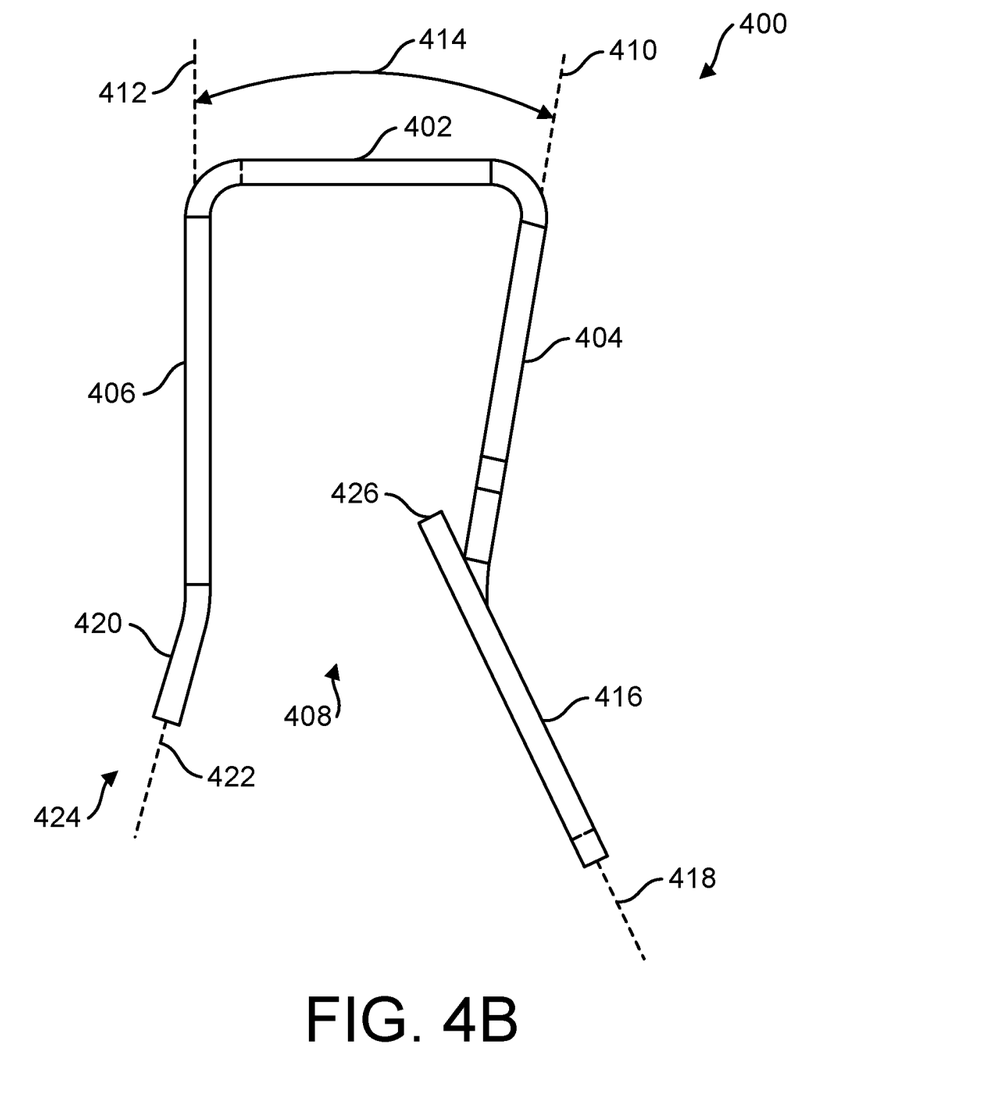
FIG. 4B shows an example of the clip of FIG. 4A.

FIG. 4A shows a perspective view of an example of a clip 400 that can be used for seal retention. FIG. 4B shows a side view of the clip 400 of FIG. 4A. The clip 400 can be used with one or more other examples described elsewhere herein. The clip 400 has a back 402 and side members 404 and 406 that extend from the back 402 toward one side. The side members 404 and 406 form a mouth 408 of the clip 400. In some implementations, the side members 404 and 406 are angled toward each other. This angling can provide a preload for mounting the clip 400 onto a portion of a frame in assembly. The side member 404 can be oriented in a direction 410, and the side member 406 can be oriented in a direction 412. For example, the side members 404 and 406 can be angled toward each other by an angle 414 between the directions 412-414.

The side member 404 can define an angled end 416 that is angled away from the side member 406. For example, the angled end 416 can be oriented in a direction 418 which points away from the side member 406 (e.g., away from the direction 412). The angled end 416 can reduce or prevent translation of a seal that is part of a glass run assembly. For example, the angled end 416 can engage with (e.g., abut) a protrusion extending from a seal in the glass run assembly.

The side member 406 can define an angled end 420 that is angled away from the side member 404. For example, the angled end 420 can be oriented in a direction 422 which points away from the side member 404 (e.g., away from the direction 410). The angled end 420 of the side member 406 defines a serration 424. The serration 424 can include one or more teeth (e.g., a row of multiple teeth substantially similar to each other). Each of the teeth can have any of multiple shapes, including, but not limited to, a rectangular shape (e.g., separated by substantially rectangular slots) or a triangular shape (e.g., separated by substantially triangular slots). The angled end 420 can reduce or prevent rotation of the seal of a glass run assembly. For example, the serration 424 can engage with (e.g., by piercing or otherwise abutting) a surface of a seal in the glass run assembly. The serration 424 can extend substantially through an entire depth of the angled end 420. For example, a line where the angled end 420 begins can pass substantially through the base of the teeth of the serration 424.

The side member 404 can define a barb 426 that extends into the mouth 408. The barb 426 can be oriented along the direction 418 of the angled end 416; that is, the barb 426 can point in the opposite direction of the angled end 416. Other orientations of the barb 426 can be used. The side member 404 can also or instead define another barb that also extends into the mouth 408. For example, the other barb can be formed on an opposite side of the side member 404 from the barb 426 in this illustration.

The above examples illustrate that a clip (e.g., the clip 400) can include a back (e.g., the back 402), and a first side member (e.g., the side member 404) and a second side member (e.g., the side member 406) each extending from the back toward one side. The first and second side members form a mouth (e.g., the mouth 408). The first side member defines a first angled end (e.g., the angled end 416) that is angled away from the second side. The second side member defines a second angled end (e.g., the angled end 420) that is angled away from the first side member. The second angled end forms a serration (e.g., the serration 424). The first side member defines a barb (e.g., the barb 426) that extends into the mouth.

Figure 5:
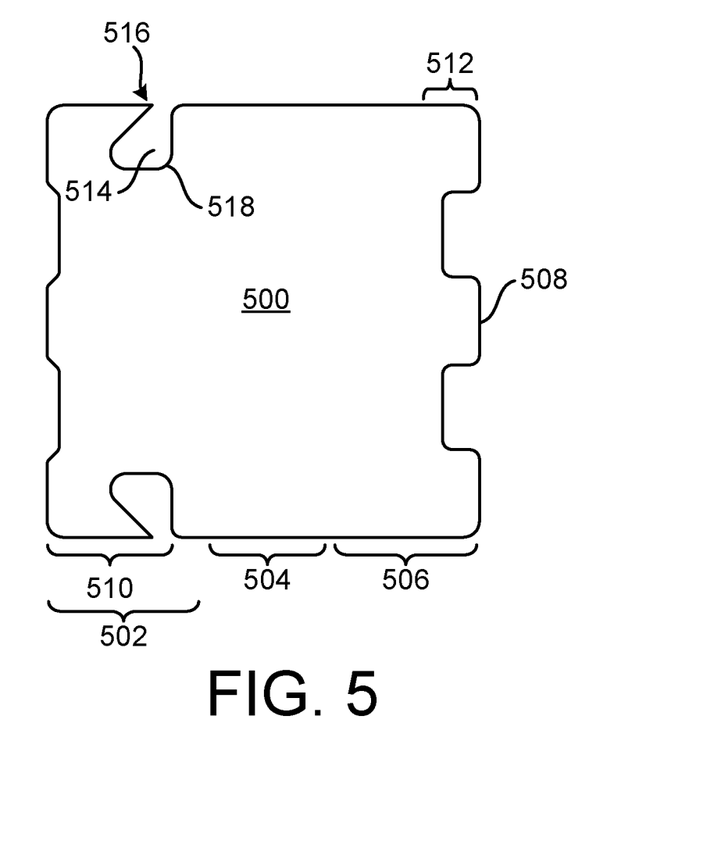
FIG. 5 shows an example of a metal piece that can be used to manufacture the clip of FIGS. 4A-4B.

FIG. 5 shows an example of a metal piece 500 that can be used to manufacture the clip 400 of FIGS. 4A-4B. The metal piece 500 can be used with one or more other examples described elsewhere herein. The metal piece 500 can be formed from sheet metal stock. In some implementations, blanking, piercing, stamping, and/or cutting (e.g., laser cutting) can be performed on the sheet metal stock to provide the metal piece 500 with the geometry and/or features shown or described herein. The metal piece 500 can be made of steel (e.g., spring steel), to name one example.

The metal piece 500 is shown to have portions 502, 504, and 506. Some examples are now described with reference also to the clip 400 of FIGS. 4A-4B for illustrative purposes only. The metal piece 500 can be bent during manufacture so that the portion 502 forms the side member 404, the portion 504 forms the back 402, and the portion 506 forms the side member 406. The portion 506 can include one or more teeth 508 that can provide the serration 424 (FIGS. 4A-4B). The portion 502 can include a sub-portion 510. For example, the portion 502 can be bent so that the sub-portion 510 forms the angled end 416. The portion 506 can include a sub-portion 512. For example, the portion 506 can be bent so that the sub-portion 512 forms the angled end 420.

The metal piece 500 can have a slot 514 formed in the portion 502. The slot 514 severs the edge of the metal piece 500 and can define a pointed end 516. In some implementations, the pointed end 516 can form the barb 426 of the clip 400. For example, the bending can be performed so that the pointed end 516 is oriented in a direction away from the angled end 416.

The slot 514 can form a narrowing 518 of the width of the metal piece 500. For example, the bending of the metal piece 500 can be performed so that the angled end 416 begins at the narrowing 518. In addition to, or instead of, the pointed end 516, the metal piece 500 can include one or more other pointed ends that form a corresponding barb in the clip 400. For example, another slot and corresponding pointed end can be formed on an edge of the metal piece 500 opposite from where the slot 514 is formed.

Figure 6:
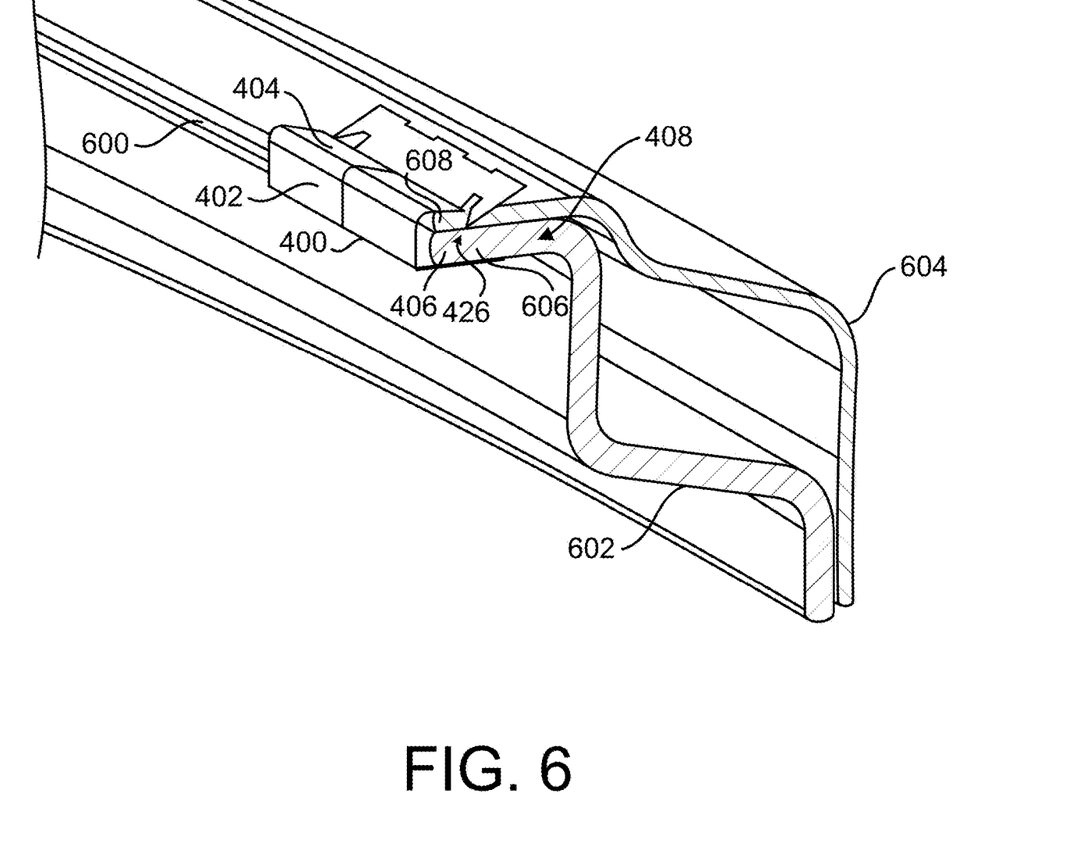
FIG. 6 shows an example of the clip of FIGS. 4A-4B mounted to a flange of a door-in-white.

FIG. 6 shows an example of the clip 400 of FIGS. 4A-4B mounted to a flange 600 of a door-in-white. Only a portion of the entire length of the flange 600 (and the frame on which it is formed) is shown for simplicity. The cross section of the flange 600 is taken along the line indicated in FIG. 2 (with some other components of the window assembly 200 not included in FIG. 6 for simplicity). The flange 600 can be used with one or more other examples described elsewhere herein.

The flange 600 can be formed by one or more components of the door-in-white. The door-in-white is created as part of the body-in-white during the manufacture of a vehicle. Here, a frame of the vehicle includes a frame reinforcement panel 602 joined to a door inner panel 604. The frame reinforcement panel 602 is a door structure that can provide header reinforcement as part of the frame around the window. The frame reinforcement panel 602 and the door inner panel 604 can be welded (e.g., laser welded) to each other as part of manufacturing the door-in-white/body-in-white. For example, this can create a door stamping assembly structure. The frame reinforcement panel 602 here forms a flange 606, and the door inner panel 604 forms a flange 608. The flange 600 is here formed of the flanges 606 and 608. This example illustrates that the clip 400 can be assembled onto the flange 600 before a seal (not shown) is also assembled onto the frame that forms the flange 600. The seal to be mounted onto the frame can be a glass run channel assembly as described herein, or another type of seal.

The clip 400 is assembled onto the flange 600 so that a portion of the flange 600 is held by the mouth 408 of the clip 400. The clip 400 can be pushed onto the flange 600 beginning at the front of the mouth 408 and until the front edge of the flange 600 is at or near the back 402. When the clip 400 has been installed, the side members 404 and 406 are situated on opposite sides of the flange 600.

The clip 400 can be preloaded to be mounted securely. For example, the barb 426 can have the greatest amount of preload of any portion of the side member 404. The clip 400 is here shown with the barb 426 entering into the flange 608 of the door inner panel 604. For example, this illustration signifies that the barb 426 has the greatest amount of preload and that the flange will cause the clip to be deformed during assembly. Also, this illustration indicates that the barb 426 can pierce a surface layer of the flange 600, such as a layer of paint on the door inner panel 604.

Figure 7A:
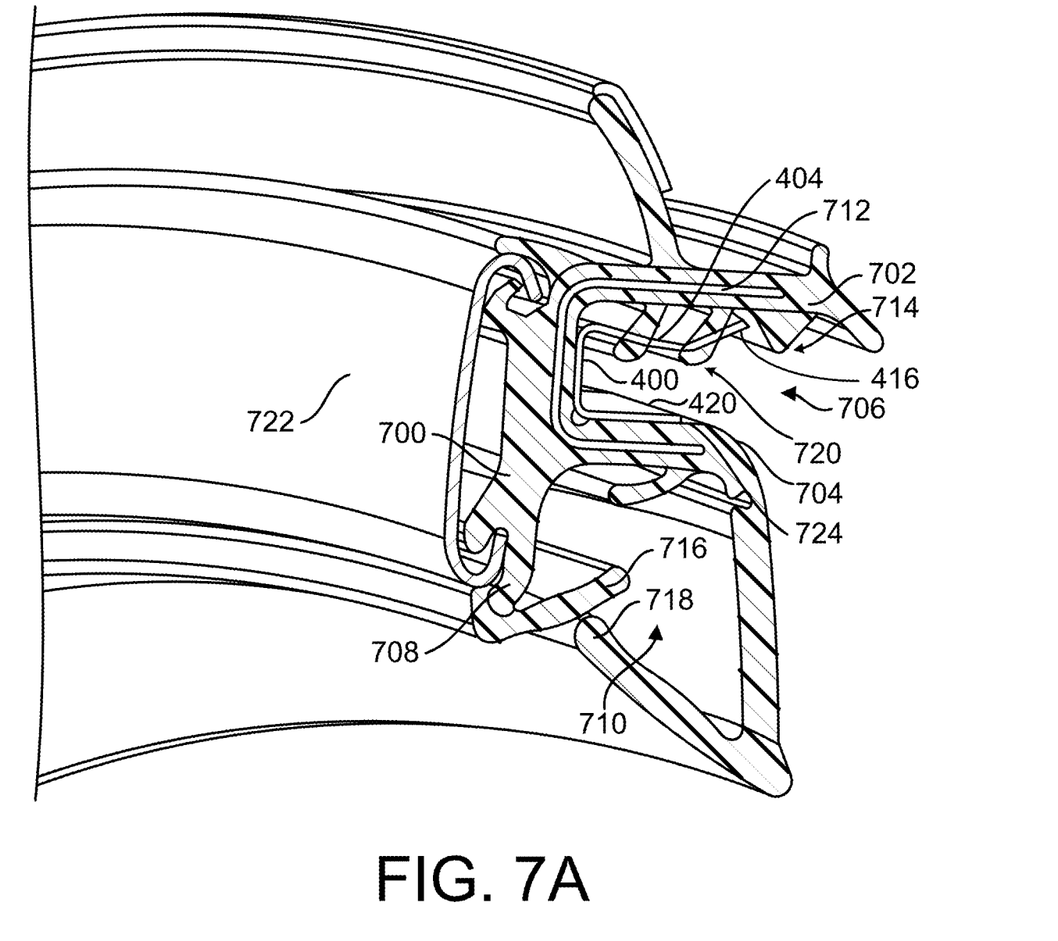
FIG. 7A shows an example of a seal assembled to the clip of FIGS. 4A-4B, wherein the door-in-white is not shown for clarity.

FIG. 7A shows an example of a seal 700 assembled to the clip 400 of FIGS. 4A-4B, wherein the door-in-white is not shown for clarity. Only a portion of the entire length of the seal 700 is shown for simplicity. The seal 700 and the clip 400 are shown in cross section taken along the line indicated in FIG. 2 (with some other components of the window assembly 200 not included in FIG. 7A for simplicity).

The seal 700 has a member 702 and a member 704 that together form a mouth 706. The clip 400 is positioned in the mouth 706. That is, the clip 400 may be assembled onto a flange (e.g., the flange 600 in FIG. 6) before seal 700 is mounted onto the assembly so that the clip 400 is positioned in the mouth 706. As mentioned, the flange and other parts of the frame/door-in-white are not shown so that the structure of the assembly can be seen better.

The member 704 and a member 708 of the seal 700 together form a channel 710. An end of the glass (e.g., an upper end of the glass 202 in FIG. 2), not visible in this illustration, can be at least temporarily positioned within the channel 710. For example, when the glass is moveable and is presently in a closed position, the end of the glass enters and remains held within the channel 710. For this reason, the channel 710 can be referred to as a glass run channel, and the entire assembly as a glass run channel assembly. An opening of the mouth 706 and an opening of the channel 710 can be oriented in substantially perpendicular directions to each other (e.g., as shown). For example, the flange on which the clip 400 is mounted can then extend substantially perpendicular to a plane of the glass.

The seal 700 can be made of one or more materials suitable for providing sealing. The seal 700 can include an elastomer material. In some implementations, the seal 700 can be characterized by one or more Shore durometer hardnesses. For example, two (or more) different Shore hardness materials can be co-extruded so that they together form the seal 700. A metal carrier 712 can be included inside the seal 700. In some implementations, the metal carrier 712 can be co-extruded with the elastomer material(s) of the rest of the seal 700. For example, the metal carrier 712 can have a profile that is substantially U-shaped.

Figure 7B:
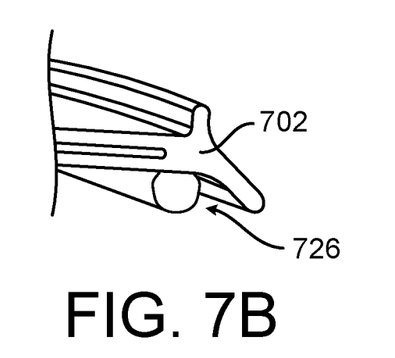
FIG. 7B shows an additional example of a protrusion of the seal in FIG. 7A.
Figure 7C:
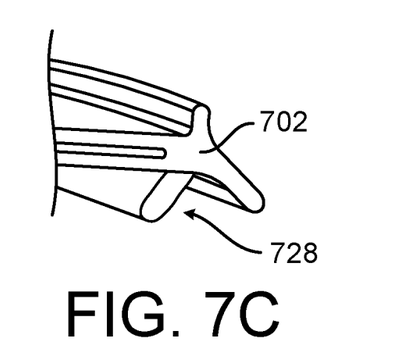
FIG. 7C shows an additional example of a protrusion of the seal in FIG. 7A.
Figure 7D:
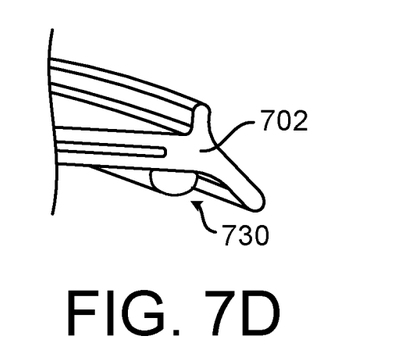
FIG. 7D shows an additional example of a protrusion of the seal in FIG. 7A.

The seal 700 includes a protrusion 714 inside the mouth 706. The protrusion 714 can be designed to be situated at or near the flange (or other part of the frame) after assembly. The angled end 416 can abut the protrusion 714. During assembly, when the seal 700 is being pushed onto the clip 400, a distinct "snap" (i.e., a tactile sensation) can be felt when the seal 700 moves into position with the angled end 416 abutting the protrusion 714. The engagement between the angled end 416 and the protrusion 714 can prevent translation of the seal 700 (and the rest of the assembly) along the length of the flange/frame. The protrusion 714 can have a profile with any of various shapes. In some implementations, a profile of the protrusion 714 is substantially triangular (e.g., as shown). In other implementations, the protrusion 714 can instead have a different form, including, but not limited to, the shape of a gripper fin or a rib. FIGS. 7B-7D show additional examples of protrusions of the seal in FIG. 7A. Each of these illustrations show only a portion of the seal 700, with the member 702 being partially visible. FIG. 7B shows an example that the seal 700 can include a protrusion 726 comprising a rib. FIG. 7C shows another example that the seal 700 can include a protrusion 728 comprising a gripper fin. FIG. 7D shows another example that the seal 700 can include a protrusion 730 comprising a rib.

The seal 700 can form one or more lips to abut the glass in at least one position of the glass (e.g., in a closed position). For example, the member 708 can define a lip 716 inside the channel 710. As another example, the member 704 can define a lip 718 inside the channel 710.

The seal 700 can form one or more grips for the clip 400. For example, the member 702 can define a gripper fin 720 to abut the side member 404. The gripper fin 720 extends into the mouth 706. For example, this illustration signifies that the gripper fin 720 and/or the rest of the seal 700 will be deformed during assembly.

The seal 700 can accommodate mounting of a finisher 722. The finisher 722 can provide a decorative cover for a glass run channel assembly.

The angled end 420 of the clip 400 can abut an inside surface 724 of the mouth 706. Because of how the present cross section is taken, the angled geometry of the angled end 420 is not clearly visible in the illustration. The serration 424 (FIGS. 4A-4B) of the angled end 420 can pierce the inside surface 724 because the serration 424 is positioned on the angled end 420. The engagement between the serration 424 and the inside surface 724 can prevent rotation of the seal 700 (and the rest of the assembly) in a clockwise direction in the present illustration.

That is, when the seal 700 and the clip 400 have been assembled together, the angled end 416 and the protrusion 714 can engage with each other, and the serration 424 can engage with the inside surface 724. In addition to the foregoing, the seal 700 can sit essentially flush against the outside of the clip 400.

Figure 8:
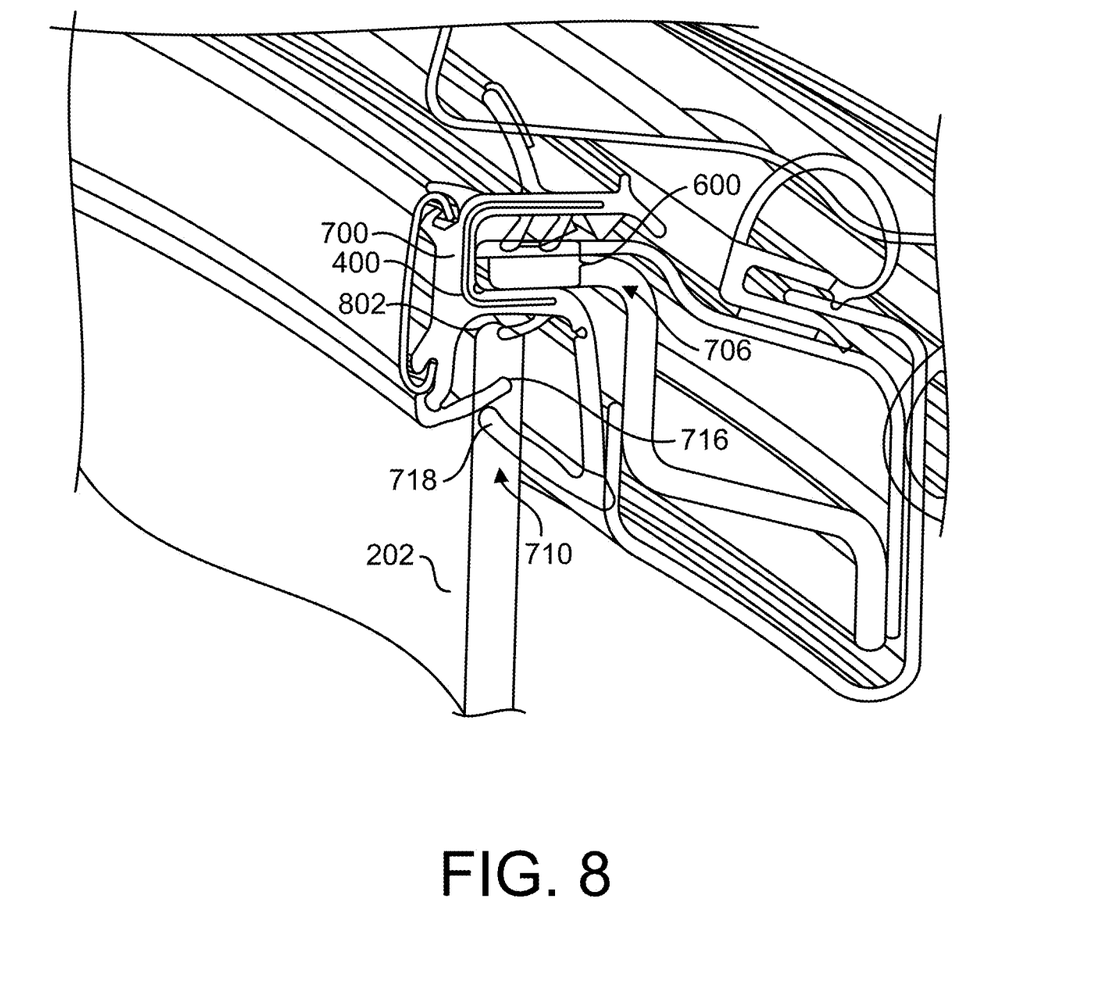
FIG. 8 shows an example of the seal and the clip of FIG. 7A, mounted to the flange of the door-in-white.

FIG. 8 shows an example of the seal 700 and the clip 400 of FIG. 7A, mounted to the flange 600 of the door-in-white. Only a portion of the entire length of the seal 700 and the flange 600 is shown for simplicity. The seal 700 and the clip 400 are shown in partial cross section taken along the line indicated in FIG. 2 (with some other components of the window assembly 200 not included in FIG. 8 for simplicity).

That is, the clip 400 can first be assembled onto the flange 600, and thereafter the seal 700 can be assembled onto the frame so that the clip 400 is positioned in the mouth 706. The glass 202 can be mounted to the vehicle body (e.g., stationary or moveable). In at least the shown position of the glass 202 (e.g., a closed position), an end 802 of the glass 202 is positioned within the channel 710. For example, this illustration signifies that the lip 716 and/or 718 and/or the rest of the seal 700 will be deformed when the end 802 of the glass 202 is positioned within the channel 710.

The above examples illustrate that a vehicle (e.g., the vehicle 100 in FIG. 1), can include: a vehicle body (e.g., the vehicle body 102) including a frame (e.g., the frame reinforcement panel 602 and the door inner panel 604 of FIG. 6) defining an opening, the frame forming a flange (e.g., the flange 600 in FIG. 6); glass (e.g., the glass 110A or 110B in FIG. 1, or the glass 202 in FIG. 2 or FIG. 8) mounted to the vehicle body, the glass having at least a first position where an entirety of the opening is covered by the glass, wherein the flange extends substantially perpendicular to a plane of the glass in the first position; a seal (e.g., the seal 700 in FIG. 7A) extending along the flange, the seal forming a first mouth (e.g., the mouth 706 in FIG. 7A) and a channel (e.g., the channel 710 in FIG. 7A), the seal including a protrusion (e.g., the protrusion 714 in FIG. 7A, the protrusion 726 in FIG. 7B, the protrusion 728 in FIG. 7C, or the protrusion 730 in FIG. 7D) inside the first mouth, wherein an end of the glass (e.g., the end 802 in FIG. 8) is positioned within the channel when the glass is in the first position; and a clip (e.g., the clip 400 in FIGS. 4A-4B) having a second mouth (e.g., the mouth 408 in FIGS. 4A-4B) that defines a first angled end and a second angled end (e.g., the angled ends 416 and 420 in FIGS. 4A-4B), wherein a portion of the flange is held by the second mouth, the seal mounted to the frame so that the clip is positioned in the first mouth, the first angled end abutting the protrusion, and the second angled end abutting an inside surface (e.g., the inside surface 724 in FIG. 7A) of the first mouth The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle comprising:
    a body including a frame defining an opening, the frame forming a flange;
    glass mounted to the body, the glass having at least a first position where an entirety of the opening is covered by the glass, wherein the flange extends substantially perpendicular to a plane of the glass in the first position;
    a seal extending along the flange, the seal forming a first mouth and a channel, the seal including a protrusion inside the first mouth, wherein an end of the glass is positioned within the channel when the glass is in the first position; and
    a clip having a second mouth, the clip comprising a back, a first side member and a second side member, each of the first and second side members extending from the back toward one side of the back, wherein the first side member defines a first angled end, wherein the second side member defines a second angled end, wherein the second angled end forms a serration including teeth extending toward the one side of the back, wherein a line where the second angled end begins extends adjacent a base of the teeth, the first side member further defining a barb that extends into the second mouth, wherein a portion of the flange is held by the second mouth, the seal mounted to the frame so that the clip is positioned in the first mouth, the first angled end abutting the protrusion, and the second angled end abutting an inside surface of the first mouth.

2. The vehicle of claim 1, wherein the glass is moveable relative to the body into at least the first position and a second position, and wherein in the second position at least a portion of the opening is not covered by the glass.

3. The vehicle of claim 1, wherein the clip comprises multiple clips.

4. The vehicle of claim 3, wherein the body comprises a closure that is openable, wherein the closure includes the frame.

5. The vehicle of claim 4, wherein the closure comprises a first door of the vehicle.

6. The vehicle of claim 5, wherein the vehicle further comprises a second door, the first door positioned forward of the second door in the vehicle, and wherein a greater number of the multiple clips are mounted to the first door than to the second door.

7. The vehicle of claim 1, wherein the seal further forms a lip inside the channel, the lip configured to abut the end of the glass when the glass is in the first position.

8. The vehicle of claim 1, further comprising a gripper fin inside the first mouth.

9. The vehicle of claim 1, wherein the seal comprises an elastomer material with a metal carrier inside the elastomer material.

10. The vehicle of claim 1, wherein an opening of the first mouth and an opening of the channel are oriented in substantially perpendicular directions to each other.

11. The vehicle of claim 1, wherein the protrusion extends along the seal, a profile of the protrusion being substantially triangular.

12. The vehicle of claim 1, wherein the protrusion extends along the seal, the protrusion comprising a gripper fin or a rib.

13. The vehicle of claim 1, wherein the serration of the second angled end abuts the inside surface of the first mouth.

14. The vehicle of claim 1, wherein the frame comprises a frame reinforcement panel joined to a door inner panel, the frame reinforcement panel and the door inner panel forming the flange.

15. The vehicle of claim 1, wherein the first and second side members are angled toward each other to form the second mouth, and wherein the first angled end is angled away from the second side member.

16. The vehicle of claim 1, wherein the first and second side members are angled toward each other to form the second mouth, and wherein the second angled end is angled away from the first side member.

* * * * *